April 24, 1934.        R. M. DEANESLY        1,955,873
PROCESS FOR PRODUCING SULPHURIC ESTERS
Filed Nov. 4, 1929
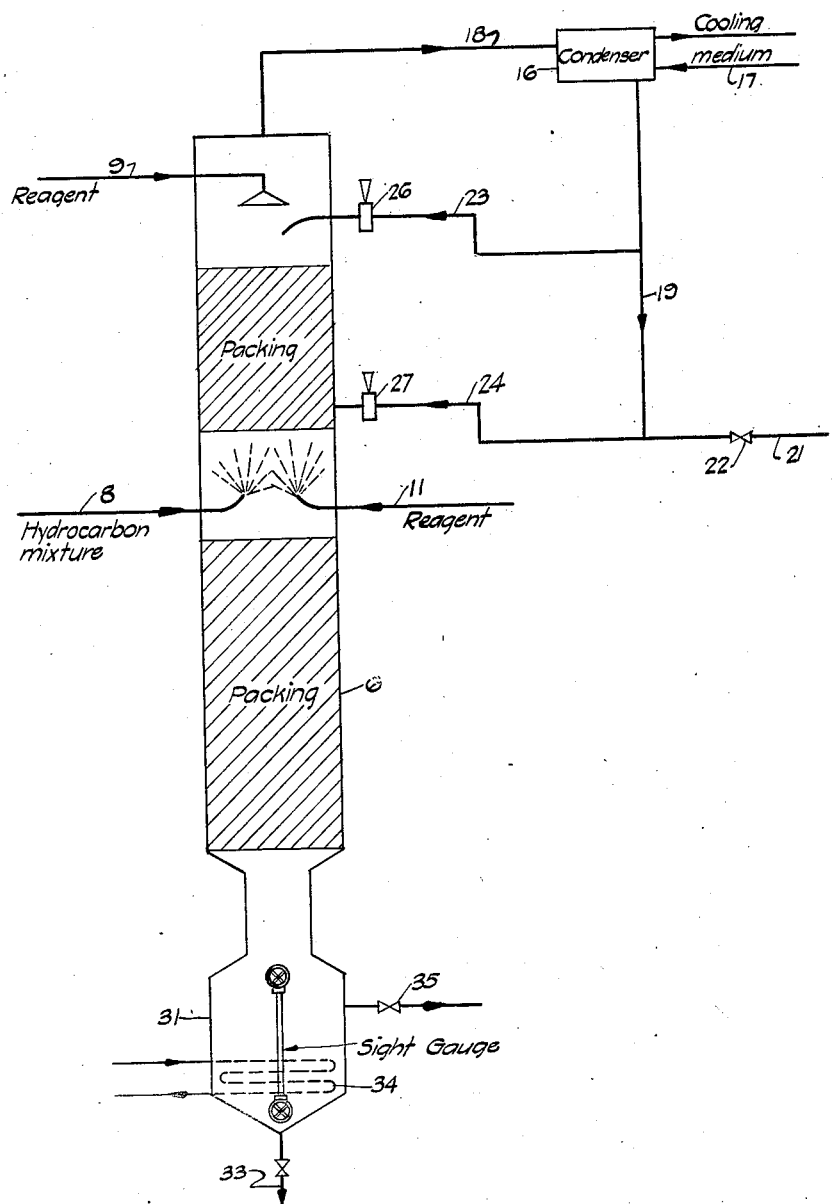
RICHARD M. DEANESLY
INVENTOR
BY HIS ATTORNEY:-

Patented Apr. 24, 1934

1,955,873

UNITED STATES PATENT OFFICE 1,955,873

PROCESS FOR PRODUCING SULPHURIC ESTERS

Richard M. Deanesly, Berkeley, Calif., assignor to Shell Development Company, San Francisco, Calif., a corporation of Delaware Application November 4, 1929, Serial No. 404,756

12 Claims. (Cl. 260—98)

My invention relates to the chemical reacting of mixtures of liquids, volatile under the conditions of reaction, with a reagent, liquid under the conditions of reaction, which chemical reaction will take place with the liberation of heat, and the product of which reaction will also be liquid under the conditions thereof. In particular it relates to the reacting of mixtures of hydrocarbons containing paraffins and olefines such as propylene and butylenes with sulphuric acid. The principal feature of my improved process is the exact control of the temperature in these exothermic reactions, particularly the control and maintenance when desired of subatmospheric temperatures, by means of the introduction and evaporation of a liquid in the reaction zone, preferably of reflux condensate.

I will describe my invention as applied to the production of the sulphuric ester of propylene from a suitable mixture of propane and propylene such as can be obtained by fractionation of the most volatile constituents of the products of cracking petroleum, which mixture is treated with sulphuric acid of an appropriate strength. It will be understood that I do not limit myself to the particular application described, but that I extend my claims for the principle of my invention in scope and equivalents as far as the state of the prior art will allow.

In carrying out this process a propylene rich material in the liquid state is caused to mix intimately in any suitable vessel with sulphuric acid. The reaction proceeds with evolution of heat, causing ebullition of the hydrocarbon mixture. The vapours evolved are led to a condenser. Such condenser may be either a heat exchanger of conventional type, or a compressor and cooler, whereby the vapours are re-liquefied. The whole or part of the condensate is utilized as "reflux" in the following manner. It is caused to flow back into the reaction zone at a sufficient number of points (e. g. 26 and 27 in diagram) so that at all points of the reaction vessel where sulphuric acid is reacting with olefines, liquid hydrocarbons are present. The advantages of this mode of operation are as follows:

1. The heat generated in the reaction is removed in an ideally effective manner by vapourization of some of the reacting material and/or the accompanying inert diluent (propane). General or local overheating is therefore impossible, the reaction temperature throughout being maintained at the boiling point of the liquid hydrocarbon material under the pressure existing in the apparatus.

The desired operating temperature can accordingly be precisely maintained by controlling the pressure on the apparatus (by automatic mechanical devices or otherwise).

2. The heat of the reaction and any heat leaks into the apparatus from any source are instantaneously removed from the reaction vessel by evaporation of hydrocarbon material, whether feed or refluxed liquid, and ultimately absorbed by the cooling medium which passes through the condensing device already described.

3. When absorption of a gas in a liquid takes place, as for example, when the above reaction is carried out in a gas scrubbing tower, heat is liberated equal to the sum of—

(a) The latent heat of condensation of the vapour.

(b) The heat of reaction between the liquefied gas and the absorbent liquid.

Whereas, by operating with the material to be absorbed already in the liquid state, the first item (a) is eliminated from the process, and the heat generated in the tower is less by that amount.

4. The refluxing of condensed hydrocarbon serves a further purpose, in that propylene which has escaped absorption in the tower can be recycled into the reaction zone to as great a degree as may be expedient; permitting a flexibility of operation of the apparatus to suit variations in the character and quantity of the reacting materials.

5. The reaction can be conducted at very low temperatures without external artificial refrigeration (e. g. at —5° F. and 20 lbs. per square inch pressure in the case of a propane-propylene mixture) by utilizing the vapourization of the hydrocarbons as desired.—In such case reflux would be created by employing a compressor and cooler to liquefy the vapours evolved by the heat of the reaction.—This is advantageous since it has been shown that for the described reaction lowering the temperature improves the yield by reducing side reactions.

6. Most of the reaction takes place between the liquid propylene and sulphuric acid. The concentration of propylene being very much greater than is the case with normal absorption from the gaseous phase, a higher rate of reaction is obtainable enabling—

(a) Smaller or more economical plant for given capacity.

(b) Practicable rates of reaction using a more dilute acid than would otherwise be possible.

(c) Practicable rates of reaction using a lower temperature than would otherwise be possible—all of which lead to consequent important advantages. The advantage of (a) is evident. With regard to (b) it has been shown that polymerization is reduced by lowering acid strength; a further gain is the saving in cost, when it becomes necessary to re-concentrate the recovered acid to a lesser degree. With regard to (c) the advantage of lowered temperatures has been mentioned under 5.

The balancing of such factors as temperature, concentration of acid, amount of refluxed hydrocarbon liquid, is determined by the throughput and percentage absorption desired from a given plant utilizing a raw material of given olefine content. Precise operating conditions will vary accordingly. The method of operation described permits a much more efficient maintenance of the operating conditions most suited to any particular case.

An apparatus having the features described in which I thus advantageously carried out the absorption of propylene in sulphuric acid is shown diagrammatically in the attached drawing. It consists of a reaction vessel in the form of a tower provided with means to cause intimate contact between the hydrocarbon mixture and the reagent—in this case, sulphuric acid; at the bottom is provided a settling tank 31 with draw-off valve 33, and at the top a line 18 by which vapours are led to a condenser 16 for providing reflux. The column is packed with rings or other contacting materials such as are commonly used in scrubbing towers or fractionating columns, with the exception of a space about the middle at which the hydrocarbon mixture is introduced at 8. The hydrocarbon mixture is introduced in liquid form at 8 through a spray nozzle, and thereby brought into intimate contact with sulphuric acid, both that introduced at 9, and a further amount which may with advantage be introduced at 11, through another spray nozzle. Liquid hydrocarbon and sulphuric acid fall down the column in an intimate mixture and react together with evolution of heat which causes vaporization of some part of the hydrocarbon. The hydrocarbon vapours ascend the column and leave by line 18, and are condensed in condenser 16. The condensate passes down line 19 and may be in part removed from the system through valve 22, in part returned to the reaction tower through line 23 and valve 26, and in part through line 24 and valve 27. The sulphuric acid in which propylene has been absorbed is withdrawn from the small settling tank 31 through valve 33. A heating coil 34 or other means of heating the liquid in the settling tank is convenient in order to vapourize any unreacted hydrocarbon reaching the settling tank. Alternatively an upper draw-off valve 35 from the settling tank may be utilized to remove the hydrocarbon layer if desired.

It will be seen that with this arrangement liquid hydrocarbon is present throughout the reaction tower contacting with sulphuric acid. And in addition there is some reaction between the saturated vapour of hydrocarbon and sulphuric acid. But any other type of reaction vessel in which a liquid hydrocarbon mixture is contacted with sulphuric acid together with means for condensing the vapours formed by the heat of reaction, and the re-introduction of the condensate formed to cause cooling of the reaction to the temperature of boiling of the hydrocarbon under the pressure maintained on the apparatus would serve the essential purpose of this process. In the apparatus, however, here described, there is a further advantage in that the reaction is to a certain extent countercurrent, in that fresh sulphuric acid entering at 9 is in contact at the top of the column with hydrocarbon largely stripped of olefine while a partially spent acid is in contact with the fresh mixture entering at 8.

The products of this reaction, the sulphuric ester of propylene (i. e. the reacted acid material) and the residual hydrocarbon not required as reflux and consisting substantially of propane, are withdrawn continuously through valves 33 and 22 respectively and utilized for such purposes as may be desired.

I claim:

1. The process of chemically reacting a hydrocarbon with a reagent, comprising: introducing the hydrocarbon volatile under reaction conditions as liquid in the reaction zone, and contacting it with the liquid reagent capable of effecting an exothermic reaction with said hydrocarbon, causing part of the hydrocarbon to evaporate in the reaction zone, the reagent remaining liquid, and controlling the temperature in the reaction zone by such vapourization.

2. The process of chemically reacting a hydrocarbon with a reagent, comprising: introducing the hydrocarbon volatile under reaction conditions as liquid in the reaction zone, and contacting it with the liquid reagent capable of effecting an exothermic reaction with said hydrocarbon, causing part of the hydrocarbon to evaporate in the reaction zone, the reagent remaining liquid, condensing at least part of the vapours evolved and introducing at least part of this condensate into the reaction zone to control the temperature therein.

3. The process of chemically reacting a mixture of hydrocarbons with a reagent having a preferential affinity for at least one of the components of the mixture comprising: introducing the mixture of hydrocarbons volatile under reaction conditions as liquid in the reaction zone, contacting it with the liquid reagent capable of effecting an exothermic reaction with said hydrocarbon, causing part of the hydrocarbons to evaporate in the reaction zone, the reagent remaining liquid, condensing at least part of the vapours evolved and introducing at least part of this condensate into the reaction zone to control the temperature therein.

4. The process of chemically reacting a mixture of olefine and paraffin hydrocarbons volatile under reaction conditions with sulphuric acid, comprising: introducing the mixture of olefines and paraffins as liquid in the reaction zone, contacting it with the liquid sulphuric acid, causing part of the hydrocarbons to evaporate in the reaction zone, the reagent remaining liquid, condensing at least part of the vapours evolved and introducing at least part of this condensate into the reaction zone to control the temperature therein.

5. The process of claim 4, carried out at a temperature below atmospheric without external refrigeration.

6. A process for preparing alkyl sulphuric esters comprising: contacting liquid olefines volatile under reaction conditions with sulphuric acid at a constant temperature obtained by permitting the vapourization of some part of the hydrocarbons and condensing the vapours in a condensing device apart from the reaction vessel, and returning the condensed hydrocarbons to the reaction vessel.

7. The process of preparing esters comprising esterifying liquid olefines volatile under reaction conditions in a reaction zone whose temperature is controlled by the evaporation of some of the olefines and their reintroduction into the system in the liquid state with an acid capable of effecting an exothermic reaction with said olefines, said acid being relatively non-volatile under the conditions of the reaction.

8. The process of preparing esters comprising esterifying liquid olefines volatile under reaction conditions with a reactive oxygen containing mineral acid which is relatively non-volatile under the conditions of the reaction in a reaction zone whose temperature is controlled by the evaporation of some of the olefines and their reintroduction into the system in the liquid state.

9. A process for carrying out chemical reactions comprising conducting the exothermic reaction of liquid reagents comprising vaporizable hydrocarbon and relatively non-vaporizable acid in a reaction zone and dissipating any surplus heat in the reaction zone by the direct introduction therein of a vaporizable liquid under vaporizing conditions.

10. A process for carrying out chemical reactions comprising reacting a liquid olefine, volatile under reaction conditions, with an acid capable of effecting an exothermic reaction with said olefine, said acid being relatively non-volatile and dissipating any surplus heat in the reaction zone by the introduction therein of a vaporizable liquid under vaporizing conditions.

11. A process for carrying out chemical reactions which comprises reacting an excess of a liquid hydrocarbon, vaporizable under the conditions of reaction, with a relatively non-vaporizable acid in the liquid phase which is capable of effecting an exothermic reaction with said hydrocarbon in a reaction zone and dissipating at least part of any surplus heat in the reaction zone by said excess.

12. A process for carrying out chemical reactions which comprises reacting liquid hydrocarbon, vaporizable under the conditions of reaction, with a relatively non-vaporizable acid in the liquid phase which is capable of effecting an exothermic reaction with said hydrocarbons in a reaction zone and dissipating at least part of any surplus heat in the reaction zone by reflux condensate.

RICHARD M. DEANESLY.